United States Patent
Li et al.

(10) Patent No.: US 11,502,636 B1
(45) Date of Patent: Nov. 15, 2022

(54) IPM MOTOR FLYING START USING HIGH FREQUENCY INJECTION

(71) Applicant: Rockwell Automation Technologies, Inc., Mayfield Heights, OH (US)

(72) Inventors: Bing Li, Mequon, WI (US); Takayoshi Matsuo, Brown Deer, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/371,738

(22) Filed: Jul. 9, 2021

(51) Int. Cl.
*H02P 27/08* (2006.01)
*H02M 5/458* (2006.01)
*H02P 1/46* (2006.01)
*H02M 1/36* (2007.01)

(52) U.S. Cl.
CPC .............. *H02P 27/08* (2013.01); *H02M 1/36* (2013.01); *H02M 5/4585* (2013.01); *H02P 1/46* (2013.01); *H02P 2203/11* (2013.01)

(58) Field of Classification Search
CPC . H02P 27/08; H02P 1/46; H02M 1/36; H02M 5/4585
See application file for complete search history.

(56) References Cited

U.S. PATENT DOCUMENTS

| | | | | |
|---|---|---|---|---|
| 8,324,851 B2* | 12/2012 | Matsuo | .................... | H02P 6/185 |
| | | | | 318/400.38 |
| 9,369,073 B1* | 6/2016 | Tian | .......................... | H02P 6/181 |
| 9,762,155 B1* | 9/2017 | Magee | ....................... | H02P 6/18 |
| 10,243,499 B2* | 3/2019 | Park | ........................... | H02P 29/62 |
| 2016/0248353 A1* | 8/2016 | Ungermann | .......... | G01D 5/2448 |

OTHER PUBLICATIONS

Zih-Cing You et al., "A Restarting Strategy for Back-EMF-Based Sensorless Permanent Magnet Synchronous Machine Drive", Energies 2019, 12, 1818; doi:10.3390/en12091818, www.mdpi.com/journal/energies, 16 pages.

Luka Pravica et al., "Flying Start of a Permanent Magnet Wind Power Generator Based on a Discontinuous Converter Operation Mode and a Phase-Locked Loop", IEEE Transactions on Industrial electronics, vol. 65, No. 2, Feb. 2018, 10 pages.

Kyoung-Min Choo et al., "Flying Start of Permanent Magnet Synchronous Machine Drives based on Variable Virtual Resistance", IEEE Transactions on Industrial Electronics, downloaded on Mar. 31, 2021, 10 pages.

* cited by examiner

Primary Examiner — Rina I Duda
(74) Attorney, Agent, or Firm — Fay Sharpe LLP

(57) ABSTRACT

A power conversion system includes an inverter and a controller configured to: responsive to startup of the system, measure a motor speed of the IPM motor; responsive to the motor speed being less than a threshold, generate the inverter switching control signals to perform high frequency injection (HFI); during the HFI, determine a measured angle of the IPM motor; during the HFI, generate the inverter switching control signals to provide an injected current to the IPM motor; detect acceleration or deceleration of the IPM motor responsive to the injected current; selectively determine an electrical angle as half the measured angle or as 180 degrees plus half the measured angle based on the detected acceleration or deceleration of the IPM motor; and responsive to determining the electrical angle, generate the inverter switching control signals to drive the IPM motor to a reference frequency in a normal operating mode of the inverter.

20 Claims, 4 Drawing Sheets

IPM MOTOR FLYING START USING HIGH FREQUENCY INJECTION

BACKGROUND INFORMATION

The subject matter disclosed herein relates to power converters.

BRIEF DESCRIPTION

In one aspect, a power conversion system includes an inverter and a controller configured to: responsive to startup of the system, measure a motor speed of an interior permanent magnet (IPM) motor; responsive to the motor speed being less than a threshold, generate the inverter switching control signals to perform high frequency injection (HFI); during the HFI, determine a measured angle of the IPM motor; during the HFI, generate the inverter switching control signals to provide an injected current to the IPM motor; detect acceleration or deceleration of the IPM motor responsive to the injected current; selectively determine an electrical angle as half the measured angle or as 180 degrees plus half the measured angle based on the detected acceleration or deceleration of the IPM motor; and responsive to determining the electrical angle, generate the inverter switching control signals to drive the rpm motor to a reference frequency in a normal operating mode of the inverter.

In another aspect, a method includes: responsive to startup of a power conversion system, measuring a motor speed of an IPM motor; responsive to the motor speed being less than a threshold, generating inverter switching control signals to perform high frequency injection (HFI); during the HFI, determining a measured angle of the IPM motor; during the HFI, generating the inverter switching control signals to provide an injected current to the IPM motor; detecting acceleration or deceleration of the IPM motor responsive to the injected current; selectively determining an electrical angle as half the measured angle or as 180 degrees plus half the measured angle based on the detected acceleration or deceleration of the IPM motor; and responsive to determining the electrical angle, generating the inverter switching control signals to drive the IPM motor to a reference frequency in a normal operating mode of an inverter.

In another aspect, a non-transitory computer readable medium has computer executable instructions which, when executed by a processor, cause the processor to: responsive to startup of a power conversion system, measure a motor speed of an IPM motor; responsive to the motor speed being less than a threshold, generate inverter switching control signals to perform high frequency injection (HFI); during the HFI, determine a measured angle of the IPM motor; during the HFI, generate the inverter switching control signals to provide an injected current to the IPM motor; detect acceleration or deceleration of the IPM motor responsive to the injected current; selectively determine an electrical angle as half the measured angle or as 180 degrees plus half the measured angle based on the detected acceleration or deceleration of the IPM motor; and responsive to determining the electrical angle, generate the inverter switching control signals to drive the IPM motor to a reference frequency in a normal operating mode of an inverter.

DETAILED DESCRIPTION

Figure 1:
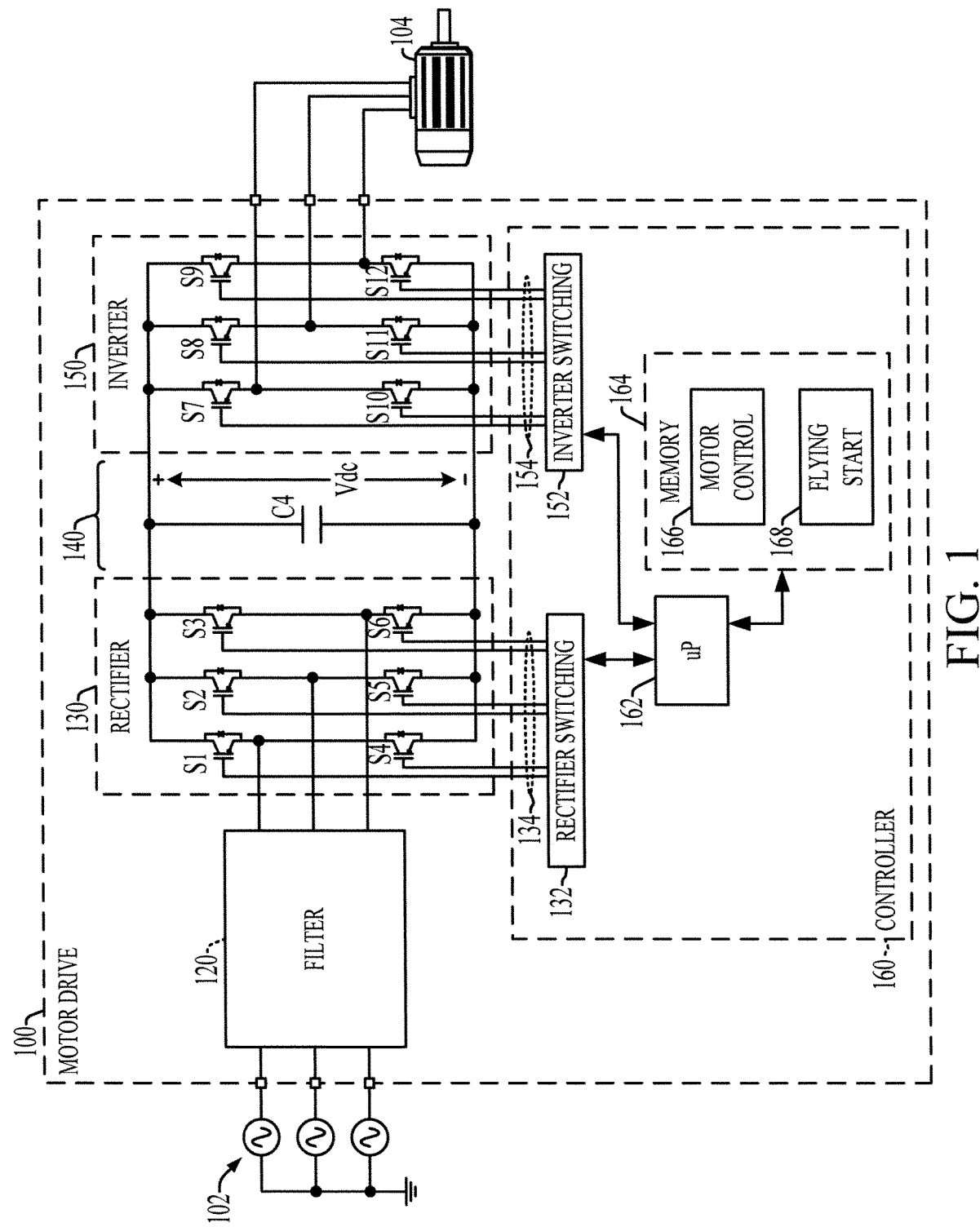
FIG. 1 is a schematic diagram of a motor drive power conversion system.

Referring now to the figures, several embodiments or implementations are hereinafter described in conjunction with the drawings, wherein like reference numerals are used to refer to like elements throughout, and wherein the various features are not necessarily drawn to scale.

Motor drives are sometimes used in driving outdoor fans or pumps in wells. In these applications, the blades of a driven fan or pump may rotate when the drive is turned off, due to wind or flow of a pumped fluid in a well. Starting a drive when the rotor of the driven motor is rotating, referred to as a flying start, may result in high current spikes in the drive. Prior to actively driving the motor, the counter electromotive force (CEMF, also referred to as back EMF) can sometimes be used to measure the rotor speed and position (e.g., angle), and the drive output voltage and speed can be matched to the respective CEMF and rotor rotation to avoid high current spikes. However, the CEMF is low at low speeds and the estimated rotor position obtained may have a large error. Static offset testing can inject pulses to estimate rotor position before starting the drive, but this technique does not work well with a rotating motor and can cause large error in estimated rotor position. Starting active driving of a rotating motor with inaccurate position angle information can result in incorrect North pole vs. South pole identification, which leads to large drive current flow and an over current fault that may trip the drive.

FIG. 1 shows an example electrical system with a motor drive power conversion system 100 that converts electrical power to drive a motor load. The system 100 in one example implements intelligent flying starts by applying high frequency injection (HFI) when the motor shaft (e.g., rotor) speed is low, and then injects a reference current (e.g., a torque-producing q-axis injected current IQREF, such as 10% of rated inverter output current)) into the motor to facilitate identification of a responsive motor acceleration or deceleration of the shaft. The system 100 detects responsive acceleration or deceleration and sets an electrical angle according to a corresponding north/south pole identification and ramps the drive output voltage and frequency to match the CEMF of the rotating motor and eventually resuming or starting normal operation without causing current spikes or tripping the drive. The example flying start apparatus and techniques can be used to start a rotating motor and resume normal operation as quick as possible, with a minimal impact on load or speed for a variety of applications such as fan/pump systems.

The motor drive power conversion system 100 receives single or multiphase AC input power from an external power source 102. The illustrated example receives a three-phase input. In other examples, single phase or other multiphase embodiments are possible. The motor drive 100 converts input power from the source 102 to deliver output power to drive a motor load 104. In one example, the motor load 104 is an interior permanent magnet (IPM) motor. The motor drive 100 includes a three-phase input filter circuit 120, such as an LC or LCL filter. The motor drive 100 also includes a rectifier 130, a DC bus or DC link circuit 140, and an output inverter 150.

The rectifier 130 and the inverter 150 are operated by a controller 160. The controller 160 includes a processor 162, an electronic memory 164 or other non-transitory computer readable medium that stores data and program instructions, as well as a rectifier controller 132 and an inverter controller 152. The controller 160 and the components thereof may be implemented as any suitable hardware, processor-executed software, processor-executed firmware, logic, and/or combinations thereof wherein the illustrated controller 160 can be implemented in processor-executed software or firmware providing various control functions by which the controller 160 receives feedback and/or input signals and/or values (e.g., setpoint(s)) and provides rectifier and inverter switching control signals 134 and 154 to operate switching devices S1-S6 of the rectifier 130 and switches S7-S12 of the inverter 150 to convert input power for providing AC output power to drive the IPM motor 104. In addition, the controller 160 and the components 132, 152 thereof can be implemented in a single processor-based device, such as a microprocessor, microcontroller, FPGA, etc., or one or more of these can be separately implemented in unitary or distributed fashion by two or more processor devices.

The motor drive 100 in one example provides an active front end (AFE) including a switching rectifier (also referred to as a converter) 130 receiving three-phase power from the source 102 through the filter circuit 120. The active rectifier 130 includes rectifier switches S1-S6, which may be insulated gate bipolar transistors (IGBTs) or other suitable form of semiconductor-based switching devices operable according to a corresponding rectifier switching control signal 134 to selectively conduct current when actuated. In addition, diodes are connected across the individual IGBTs S1-S6. In operation, switching of the rectifier switches S1-S6 is controlled according to pulse width modulated rectifier switching control signals 134 from the rectifier switching controller 132 to provide active rectification of the AC input power from the source 102 to provide a DC bus voltage Vdc across a DC bus capacitor C4 in the DC link circuit 140.

The inverter 150 includes switches S7-S12 coupled to receive power from the DC bus 140 and to provide AC output power to the IPM motor 104. The inverter switches S7-S12 can be any form of suitable high-speed switching devices, including without limitation IGBTs that operate according to switching control signals 154 from the inverter switching control component 152 of the drive controller 160. The inverter 150 converts the DC power to AC power to drive the IPM motor 104. The individual inverter switching devices S7-S12 selectively couple a respective AC node with a respective one of first and second DC nodes of the DC bus circuit 140 according to a respective inverter switching control signal 154.

In certain examples, the controller 160 receives various input signals or values, including setpoint signals or values for desired output operation, such as motor speed, position, torque, etc., as well as feedback signals or values representing operational values of various portions of the motor drive 100 and electrical system components of the drive 100. In addition, the controller 160 in certain examples receives one or more voltage and/or current feedback signals or values from sensors to indicate the DC bus voltage Vdc, line to line AC input voltage values, motor line to line voltage values and/or currents, etc. The memory 164 stores motor control program instructions 166 stored in the memory 164, such as speed control, torque control, etc., as well as flying start program instructions 168.

Figure 2:
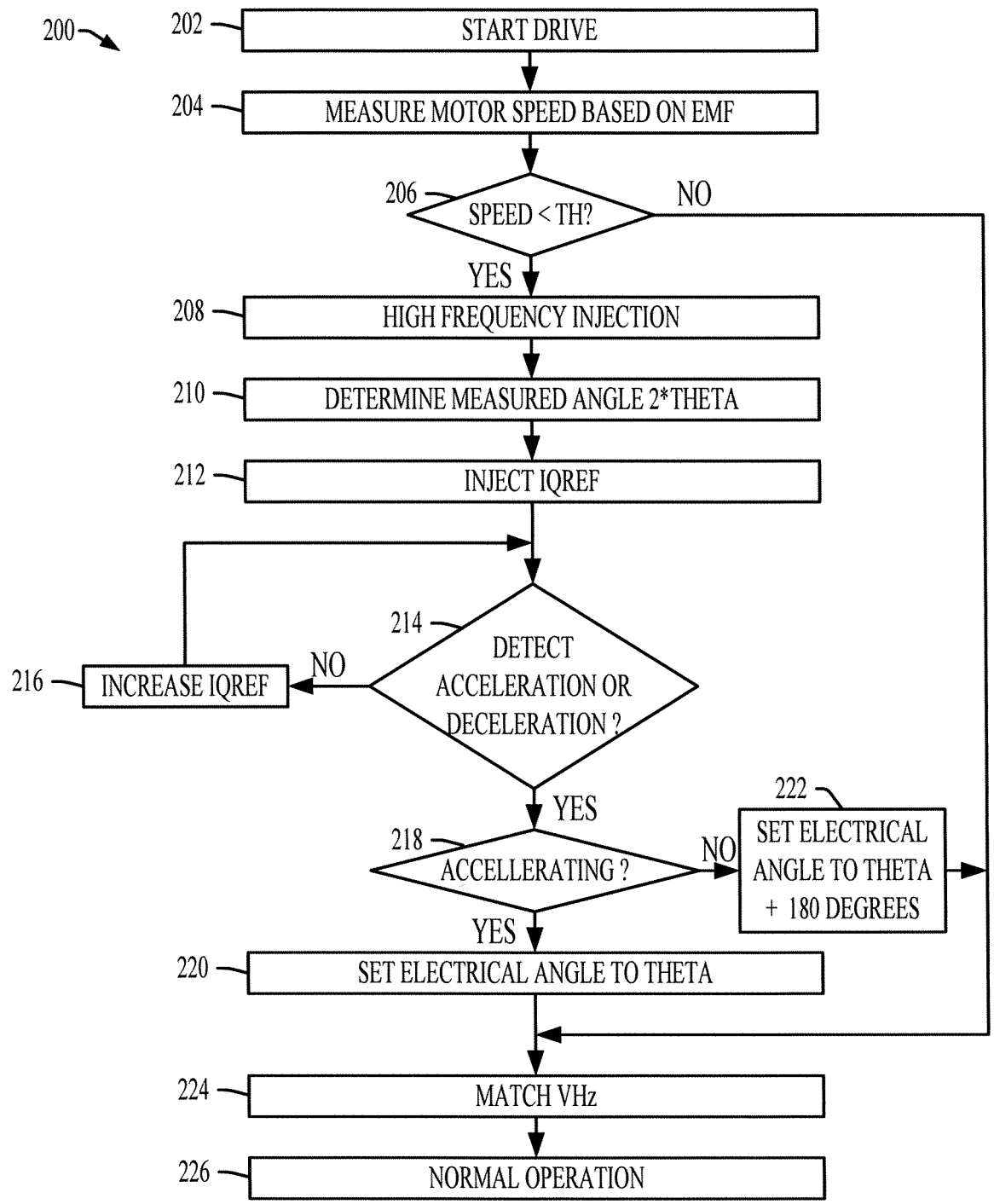
FIG. 2 is a flow diagram of a method.

FIG. 2 is a flow diagram of a method 200 implemented by the controller 160 for flying start of the IPM motor 104, for example, by the processor 162 executing the flying start program instructions 168 stored in the memory 164. The motor drive power conversion system 100 is started at 202, for example, by a user or by a system component (e.g., a thermostat determining that fan cooling is needed, etc.). In response to startup of the system 100, the controller 160 measures the motor speed of the IPM motor 104 at 204 and compares the motor speed to a threshold TH at 206. In one example, the threshold TH is a non-zero value that is 10 percent of a rated speed of the inverter 150 or less, such as about 5 Hz in one implementation. If the motor speed is greater than or equal to the threshold TH (NO at 206), the method 200 proceeds to 224 and 226 and the controller 160 obtains shaft position and speed by measuring the Cemf voltage at the inverter output, matches VHz at 224 to catch up the electrical angle of the inverter output waveforms with the rotor speed, and matches the inverter output voltage with the Cemf voltage. At 226, the controller 160 transfers to normal operation, for example, generating the inverter switching control signals 154 to implement open loop pulse width modulation (PWM) control of the IPM motor speed.

Responsive to the motor speed being less than the threshold TH (YES at 206), the controller 160 generates the inverter switching control signals 154 to perform high frequency injection (HFI) at 208 to obtain the rotor angle for IPM motor 104, for example, to generate high frequency inverter output voltages at a frequency above a normal operating frequency of the IPM motor (e.g., greater than twice the inverter output frequency that drives the IPM motor 104 at its rated maximum motor speed). At 210, the controller 160 determines a measured angle of the IPM motor 104. The advantage of the HFI is that it yields an estimate of the rotor position at low speed, but the measured angle during HFI has a value of twice the actual rotor angle (e.g., 2*THETA) of one of the poles (North or South).

To disambiguate the measured angle determined at 210, the controller 160 performs North/South pole identification using injected reference current to identify whether the actual rotor position is at THETA or THETA +180 degrees before adjusting the inverter electrical angle for VHz matching at 224 and normal operation at 226. At 212, the controller 160 provides an injected current IQREF to the IPM motor 104. In one example, the controller 160 the injected current IQREF starts at a percentage of the inverter rated current, such as 5% or 10% of the rated current of the inverter 150.

At 214, during the HFI, the controller 160 determines acceleration or deceleration of the IPM motor 104 by a measured angle (2*THETA) from HFI injection (e.g., in response to the injected current IQREF). If not (NO at 214), the controller increases the injected current IQREF at 216 (e.g., from a starting value of 5% of the rated inverter current) responsive to not detecting 214 acceleration or deceleration of the IPM motor 104 responsive to the injected current IQREF. Once the controller 160 detects acceleration or deceleration of the IPM motor 104 responsive to the injected current IQREF (e.g., YES at 214), the controller 160 verifies the identified rotor pole as North or South and determines an electrical angle THETA as half the measured angle (e.g., (2*THETA)/2) or as 180 degrees plus half the measured angle (e.g., 180+(2*THETA)/2) based on the detected acceleration or deceleration of the IPM motor 104.

At 218, the controller 160 determines, based on the measured angle (2*THETA) from HFI injection, whether the IPM motor 104 is accelerating in response to the injected current IQREF. In one example, the controller 160 verifies acceleration or deceleration at 218 by the change of electrical angle based on the measured angle (2*THETA) from HFI injection. If so (YES at 218), the controller 160 sets the electrical angle THETA at 220 to half the measured angle 2*THETA/2 responsive to detecting acceleration of the IPM motor 104. Otherwise (e.g., motor deceleration detected, NO at 214), the controller 160 sets the electrical angle THETA to 180 degrees plus half the measured angle at 222 responsive to detecting deceleration of the IPM motor 104.

At 224, responsive to determining the electrical angle THETA at 220 or 222, the controller 160 generates the inverter switching control signals 154 at 224 to match a voltage and a frequency of the inverter 150 to a motor voltage and the motor speed, respectively, before driving the IPM motor 104 to a reference frequency at 226 in the normal operating mode of the inverter 150.

Figure 3:
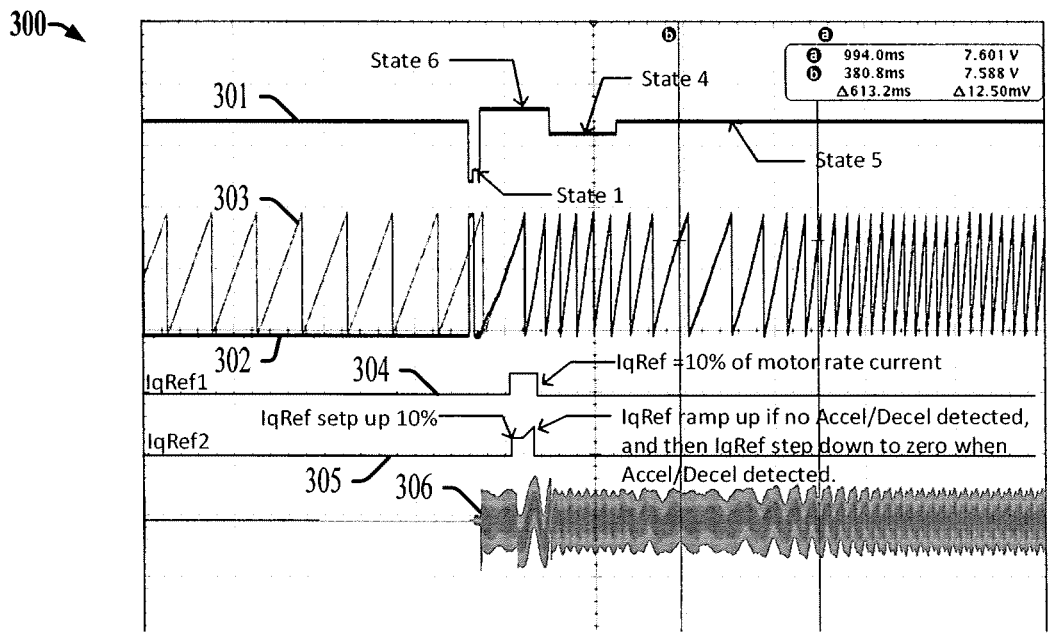
FIG. 3 is a graph.

FIG. 3 shows a graph 300 of signals in the system 100 in one example implementation of the flying start method 200 by the controller 160. The graph 300 includes a curve 301 that shows the state of a state machine implemented by the controller 160 in execution of the flying start program instructions 168, where FIG. 3 shows several example flying start states labeled "State 1", "State 6", "State 4", and "State 5". The graph 300 also shows a curve 302 of the electrical angle THETA, and a curve 303 of the actual rotor position. A curve 304 in FIG. 3 shows a first implementation IqRef1 of the injected current IQREF, and a curve 305 shows a second implementation IqRef2 of the injected current IQREF in another example. A curve 306 in FIG. 3 shows an example inverter output phase current at the output of the inverter 150 during the flying start procedure. The graph 300 shows one example of the curves 301, 302, 303, 304, 305, and 306 for a drive system 100 using a 10 pole IPM motor 104 rated at 400 V, 40.7 A, 250 Hz, 3000 rpm, and 29.5 Kw. This example shows flying start when the rotor of the IPM motor 104 is rotating at 60 rpm (e.g., 5 Hz).

In the flying start state 1, the controller 160 measures the rotor speed and position. In flying start state 6, the controller 160 sets the d and q-axis reference currents IdRef and IqRef used in the motor control (e.g., motor control instructions 166 in FIG. 1) to zero in a first half period. Thereafter, the controller 160 sets the torque-producing q-axis reference current IQREF to 10% of the rated current of the inverter 150. In flying start state 4, the controller 160 adjusts the North/South pole based on detected acceleration or deceleration of the IPM motor 104 (e.g., indicated in the graph 300 as ThetaE no adjustment due to Accel). In flying start state 5, the controller 160 completes the flying start. The controller 160 applies the HFI in this example from starting of State 6 and the HFI continues to normal operation. The controller 160 keeps IdRef1 at zero in this example. In one example, the controller 160 controls IqRef1 to step up from zero to 10% motor related current in the middle of state 6 and sets IqRef1 back to zero at the end of state 6. In another implementation, the controller 160 steps IqRef2 up to 10% in the middle of state 6, then ramps IqRef2 up if no acceleration or deceleration is detected (e.g., at 216 in FIG. 2), and finally will step IqRef2 down to zero in responsive to detection of acceleration or deceleration.

Figure 4:
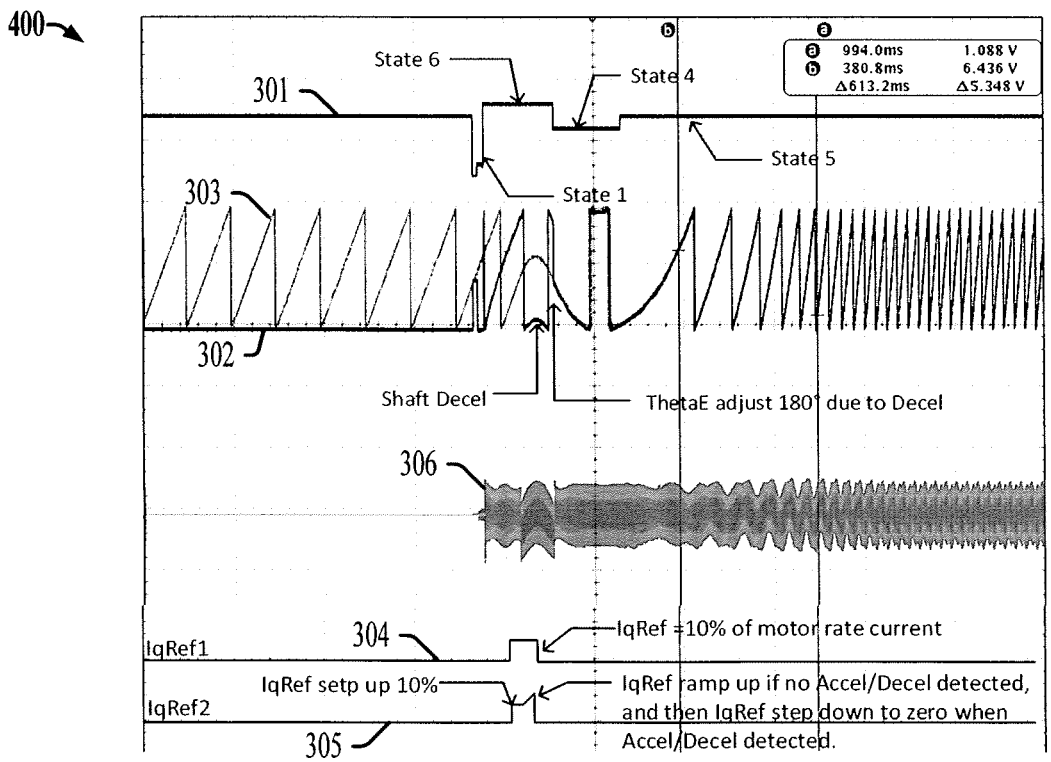
FIG. 4 is a graph.

FIG. 4 shows a graph 400 to illustrate another example in which rotor deceleration is detected by the controller 160. The graph 400 includes the curves 301, 302, 303, 304, 305, and 306 described above for the example drive system 100 using a 10 pole IPM motor 104 rated at 400 V, 40.7 A, 250 Hz, 3000 rpm, and 29.5 Kw. This example shows flying start when the rotor of the IPM motor 104 is again rotating at 60 rpm (e.g., 5 Hz). In the flying State 6, the controller 160 sets IdRef and IqRef to 0 in a first half period, then sets IDQREF to 10% torque current. In the flying start state 4, the controller 160 adjusts the N/S pole due to detected deceleration (e.g., sets THETA to half the measured angle +180 degrees). In flying start state 5, the controller 160 completes the flying start.

Figure 5:
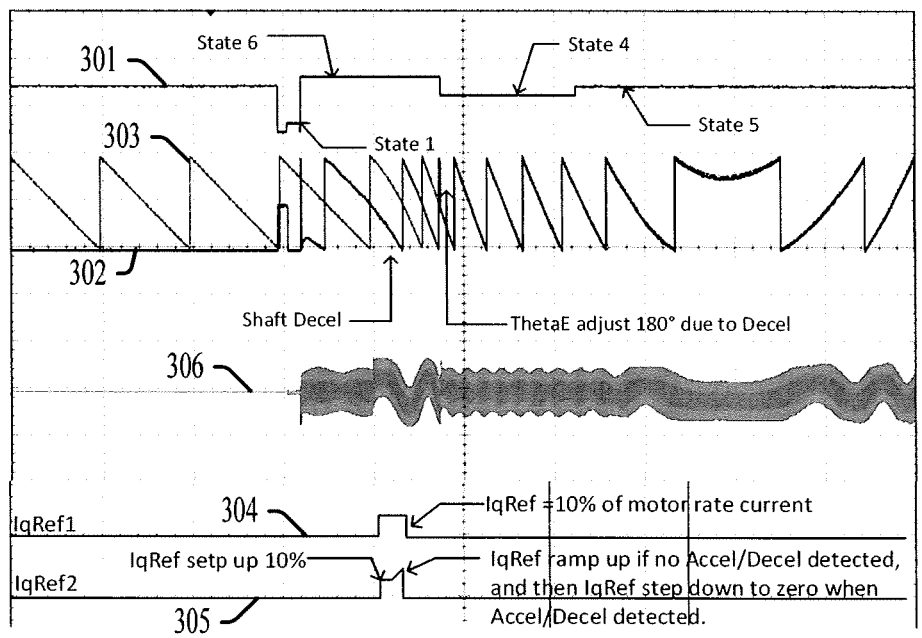
FIG. 5 is a graph.

FIG. 5 shows a graph 500 having the above-described curves 301, 302, 303, 304, 305, and 306 for the example drive system 100 using a 10 pole IPM motor 104 rated at 400 V, 40.7 A, 250 Hz, 3000 rpm, and 29.5 Kw. In this example, the rotor is initially rotating in the opposite direction at −60 rpm. In the flying start state 1, the controller 160 measures the rotor speed. In the flying start state 6, the controller 160 sets IdRef and IqRef to 0 in a first half period, and then sets IQREF to 10% torque current. In the flying start state 4, the controller 160 adjusts the N/S pole due to detected deceleration (e.g., sets THETA to half the measured angle+180 degrees). In flying start state 5, the controller 160 completes the flying start.

Various embodiments have been described with reference to the accompanying drawings. Modifications and changes may be made thereto, and additional embodiments may be implemented, without departing from the broader scope of the invention as set forth in the claims that follow. The specification and drawings are accordingly to be regarded in an illustrative rather than restrictive sense. The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   an inverter configured to convert the DC power to AC power to drive an interior permanent magnet (IPM) motor, the inverter including inverter switching devices respectively configured to selectively couple a respective AC node with a respective one of first and second DC nodes according to a respective inverter switching control signal;
   a controller, configured to:
   responsive to startup of the system, measure a motor speed of the IPM motor;
   responsive to the motor speed being less than a threshold, generate the inverter switching control signals to perform high frequency injection (HFI);
   during the HFI, determine a measured angle of the IPM motor;
   during the HFI, generate the inverter switching control signals to provide an injected current to the IPM motor;
   detect acceleration or deceleration of the IPM motor responsive to the injected current;
   selectively determine an electrical angle as half the measured angle or as 180 degrees plus half the measured angle based on the detected acceleration or deceleration of the IPM motor; and
   responsive to determining the electrical angle, generate the inverter switching control signals to drive the IPM motor to a reference frequency in a normal operating mode of the inverter.

2. The system of claim 1, wherein the controller is configured to:
responsive to detecting acceleration of the IPM motor, set the electrical angle to half the measured angle; and
responsive to detecting deceleration of the IPM motor, set the electrical angle to 180 degrees plus half the measured angle.

3. The system of claim 2, wherein the controller is configured to:
responsive to determining the electrical angle, generate the inverter switching control signals to match a voltage and a frequency of the inverter to a motor voltage and the motor speed, respectively, before driving the IPM motor at the reference frequency in the normal operating mode of the inverter.

4. The system of claim 3, wherein the threshold is 10 percent of a rated speed of the inverter or less.

5. The system of claim 3, wherein the controller is configured to:
responsive to not detecting acceleration or deceleration of the IPM motor responsive to the injected current, increase the injected current.

6. The system of claim 2, wherein the threshold is 10 percent of a rated speed of the inverter or less.

7. The system of claim 2, wherein the controller is configured to:
responsive to not detecting acceleration or deceleration of the IPM motor responsive to the injected current, increase the injected current.

8. The system of claim 1, wherein the controller is configured to:
responsive to determining the electrical angle, generate the inverter switching control signals to match a voltage and a frequency of the inverter to a motor voltage and the motor speed, respectively, before driving the IPM motor at the reference frequency in the normal operating mode of the inverter.

9. The system of claim 1, wherein the threshold is 10 percent of a rated speed of the inverter or less.

10. The system of claim 1, wherein the controller is configured to:
responsive to not detecting acceleration or deceleration of the IPM motor responsive to the injected current, increase the injected current.

11. A method, comprising:
responsive to startup of a power conversion system, measuring a motor speed of an IPM motor;
responsive to the motor speed being less than a threshold, generating inverter switching control signals to perform high frequency injection (HFI);
during the HFI, determining a measured angle of the IPM motor;
during the HFI, generating the inverter switching control signals to provide an injected current to the IPM motor;
detecting acceleration or deceleration of the IPM motor responsive to the injected current;
selectively determining an electrical angle as half the measured angle or as 180 degrees plus half the measured angle based on the detected acceleration or deceleration of the IPM motor; and
responsive to determining the electrical angle, generating the inverter switching control signals to drive the IPM motor at a reference frequency in a normal operating mode of an inverter.

12. The method of claim 11, further comprising:
responsive to detecting acceleration of the IPM motor, setting the electrical angle to half the measured angle; and
responsive to detecting deceleration of the IPM motor, setting the electrical angle to 180 degrees plus half the measured angle.

13. The method of claim 12, further comprising:
responsive to determining the electrical angle, generating the inverter switching control signals to match a voltage and a frequency of the inverter to a motor voltage and the motor speed, respectively, before driving the IPM motor at the reference frequency in the normal operating mode of the inverter.

14. The method of claim 13, wherein the threshold is 10 percent of a rated speed of the inverter or less.

15. The method of claim 13, further comprising:
responsive to not detecting acceleration or deceleration of the IPM motor responsive to the injected current, increase the injected current.

16. The method of claim 11, further comprising:
responsive to determining the electrical angle, generating the inverter switching control signals to match a voltage and a frequency of the inverter to a motor voltage and the motor speed, respectively, before driving the IPM motor at the reference frequency in the normal operating mode of the inverter.

17. The method of claim 11, wherein the threshold is 10 percent of a rated speed of the inverter or less.

18. The method of claim 11, further comprising:
responsive to not detecting acceleration or deceleration of the IPM motor responsive to the injected current, increase the injected current.

19. A non-transitory computer readable medium having computer executable instructions which, when executed by a processor, cause the processor to:
responsive to startup of a power conversion system, measure a motor speed of an IPM motor;
responsive to the motor speed being less than a threshold, generate inverter switching control signals to perform high frequency injection (HFI);
during the HFI, determine a measured angle of the IPM motor;
during the HFI, generate the inverter switching control signals to provide an injected current to the IPM motor;
detect acceleration or deceleration of the IPM motor responsive to the injected current;
selectively determine an electrical angle as half the measured angle or as 180 degrees plus half the measured angle based on the detected acceleration or deceleration of the IPM motor; and
responsive to determining the electrical angle, generate the inverter switching control signals to drive the IPM motor to a reference frequency in a normal operating mode of an inverter.

20. The non-transitory computer readable medium of claim 19, having computer executable instructions which, when executed by the processor, cause the processor to:
responsive to detecting acceleration of the IPM motor, set the electrical angle to half the measured angle; and
responsive to detecting deceleration of the rpm motor, set the electrical angle to 180 degrees plus half the measured angle.

* * * * *